Jan. 31, 1928.　　　　　　　　　　　　　　　　　1,657,992
C. CHAMBERS
APPARATUS FOR DELIVERING MEASURED QUANTITIES BY VOLUME
OF PETROL AND OTHER LIQUIDS
Filed July 11, 1924　　　　4 Sheets-Sheet 1

Jan. 31, 1928.  1,657,992
C. CHAMBERS
APPARATUS FOR DELIVERING MEASURED QUANTITIES BY VOLUME
OF PETROL AND OTHER LIQUIDS
Filed July 11, 1924   4 Sheets-Sheet 2
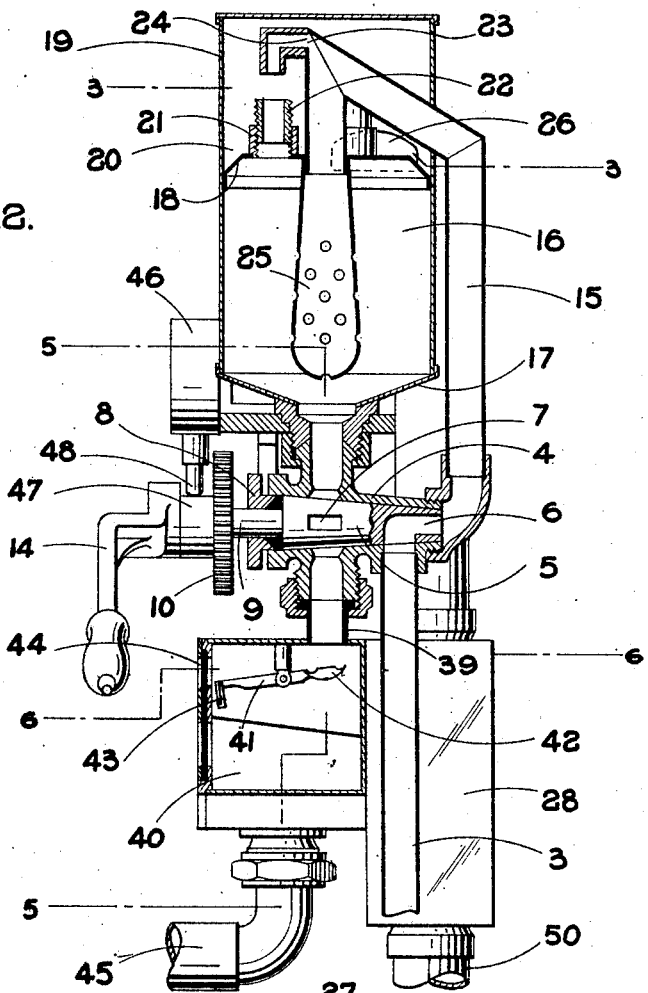
FIG.2.
FIG.3.
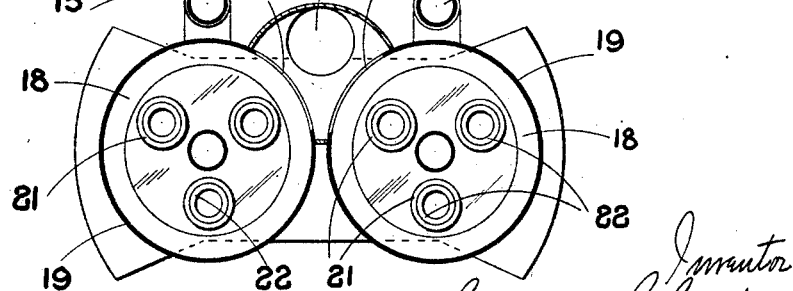

Jan. 31, 1928. 1,657,992
C. CHAMBERS
APPARATUS FOR DELIVERING MEASURED QUANTITIES BY VOLUME
OF PETROL AND OTHER LIQUIDS
Filed July 11, 1924 4 Sheets-Sheet 3
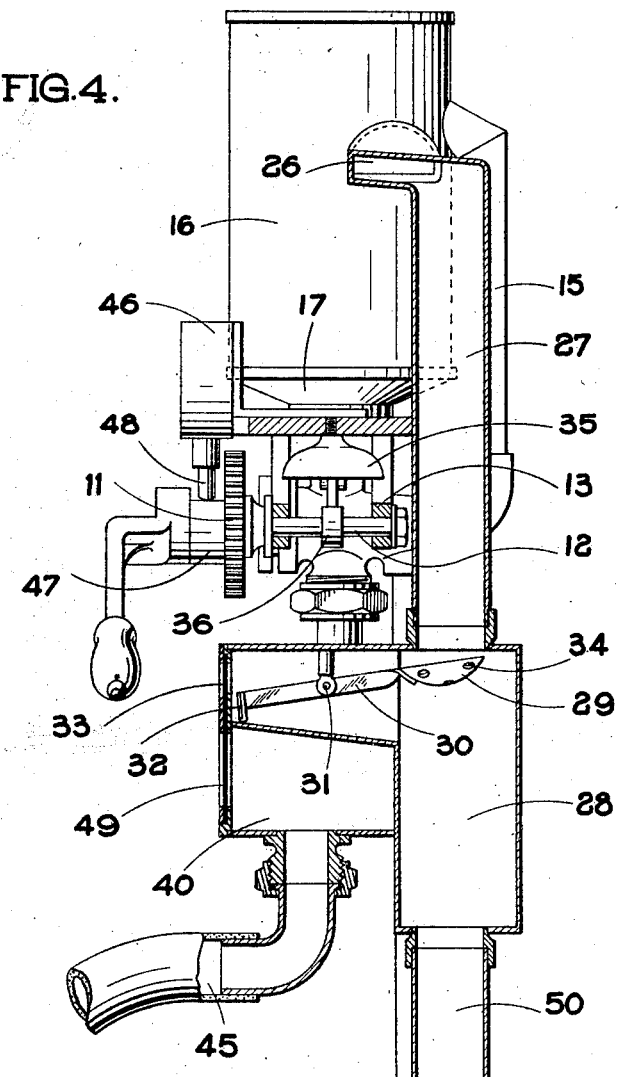
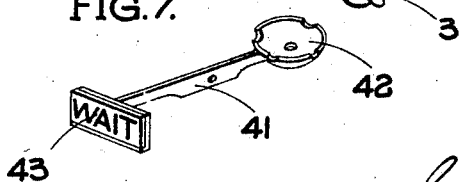

Jan. 31, 1928.
C. CHAMBERS
1,657,992
APPARATUS FOR DELIVERING MEASURED QUANTITIES BY VOLUME
OF PETROL AND OTHER LIQUIDS
Filed July 11, 1924    4 Sheets-Sheet 4
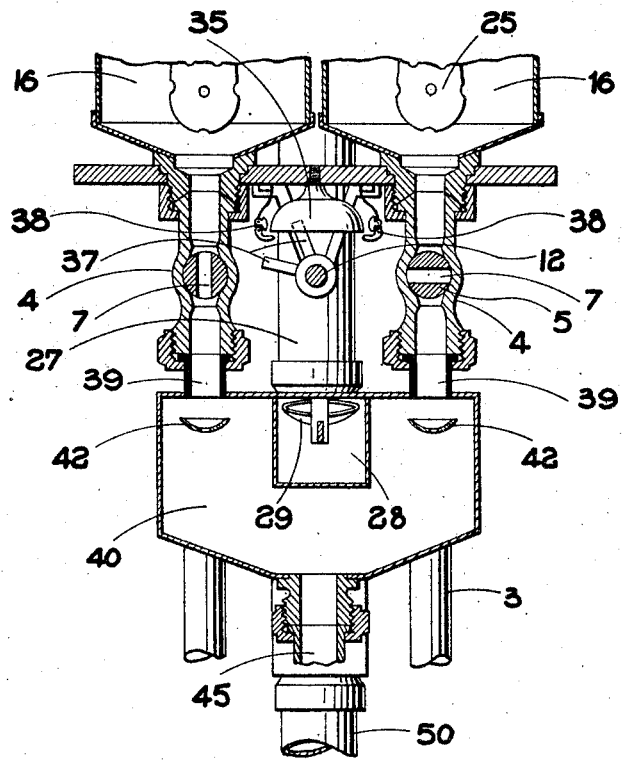
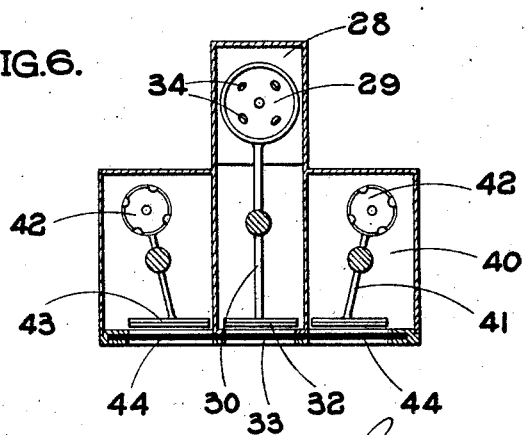

Patented Jan. 31, 1928.

1,657,992

UNITED STATES PATENT OFFICE.

CORNELIUS CHAMBERS, OF SHIRLEY, ENGLAND.

APPARATUS FOR DELIVERING MEASURED QUANTITIES BY VOLUME OF PETROL AND OTHER LIQUIDS.

Application filed July 11, 1924, Serial No. 725,460, and in Great Britain July 14, 1923.

My invention relates to apparatus for delivering measured quantities by volume of petrol or other liquids and is particularly applicable to that class of such which are employed in connection with roadside filling stations wherein one or more measuring tanks are provided in which the liquid is passed until the tank is completely filled, when the liquid is discharged.

The primary object of the present invention is to provide improved means to guard against fraud whereby the purchaser can satisfy himself that each measuring tank is filled before the discharge commences and/or whereby the purchaser can satisfy himself that each measuring chamber is completely discharged.

My invention is carried into effect by providing visual, audible or other signals which can be observed by the purchaser and by which the purchaser can ensure that the apparatus is operated to give full measure.

Further, one of the objects of the present invention is to provide means for giving the necessary signals without making use of electrical contacts (which are liable to produce sparks) such as have already been proposed in connection with float-operated signals associated with overflow or discharge pipes in this type of apparatus.

According to the present invention I provide a mechanical device either in the path of the discharge liquid, or in the path of liquid which has overflowed from the tank after same has been completely filled, or such devices are provided both in the path of the discharging liquid and in the path of the overflowing liquid, the said mechanical device or devices being adapted to be operated by the flow of the discharging or overflowing liquid and serving to control or set in operation an indicating device or signal.

In the preferred arrangement each measuring tank is provided with an overflow opening through which liquid only passes after the tank has been completely filled and each measuring tank is provided with a discharge opening and conduits or passages are provided both for the overflow liquid and for the discharging liquid, the said conduits or passages leading to separate mechanical devices which are adapted to control or set in operation separate indicating devices or signals.

The mechanical devices referred to may comprise cups, and these cups may be applied to levers or other movable members and the cups may be provided with openings in their lower parts or may be otherwise constructed or arranged to retain the overflowing or discharging liquid for a time so as to move the levers or other members with which they are associated, but to discharge themselves automatically after an interval.

For constituting the overflow passage the upper part of each measuring chamber may be provided with an opening at the top and the upper part of each measuring chamber may be surrounded by an annular gallery or chamber for catching the overflow, and the overflow conduit for each chamber may be formed by a pipe leading from said gallery or annular chamber.

In connection with the indicating device associated with the discharge from each chamber, it will be observed that this will remain in operation during the whole period of the discharge of said chamber so that if the purchaser watches the indicating device or signal he will know that the discharge valve from that measuring tank should not be closed until after the indicating device or signal either disappears or otherwise indicates that a complete discharge has taken place.

My invention may be applied to that class of apparatus comprising a plurality of measuring tanks adapted to be filled by a single pump, suitable valves being provided for directing the supply of liquid first to one tank and then to the other, the arrangement being such that one tank is filled while the other is discharging and in connection with such apparatus I may provide a single indicator or signal for indicating when either or any of the measuring tanks are full, but I prefer to provide a separate indicator or signal for indicating the discharge from each measuring tank.

Referring to the drawings:—

Figure 2 is a sectional view on line 2—2 of Figure 1.

Figure 3 is a sectional plan view on line 3—3 of Figure 2.

Figure 4 is a sectional side view taken on the centre line of Figure 1.

Figure 5 is a section on line 5—5 of Figure 2.

Figure 6 is a sectional plan view upon line 6—6 of Figure 2.

Figure 7 is a perspective view showing one of the combined mechanical appliances and indicators or signals.

Figure 1:
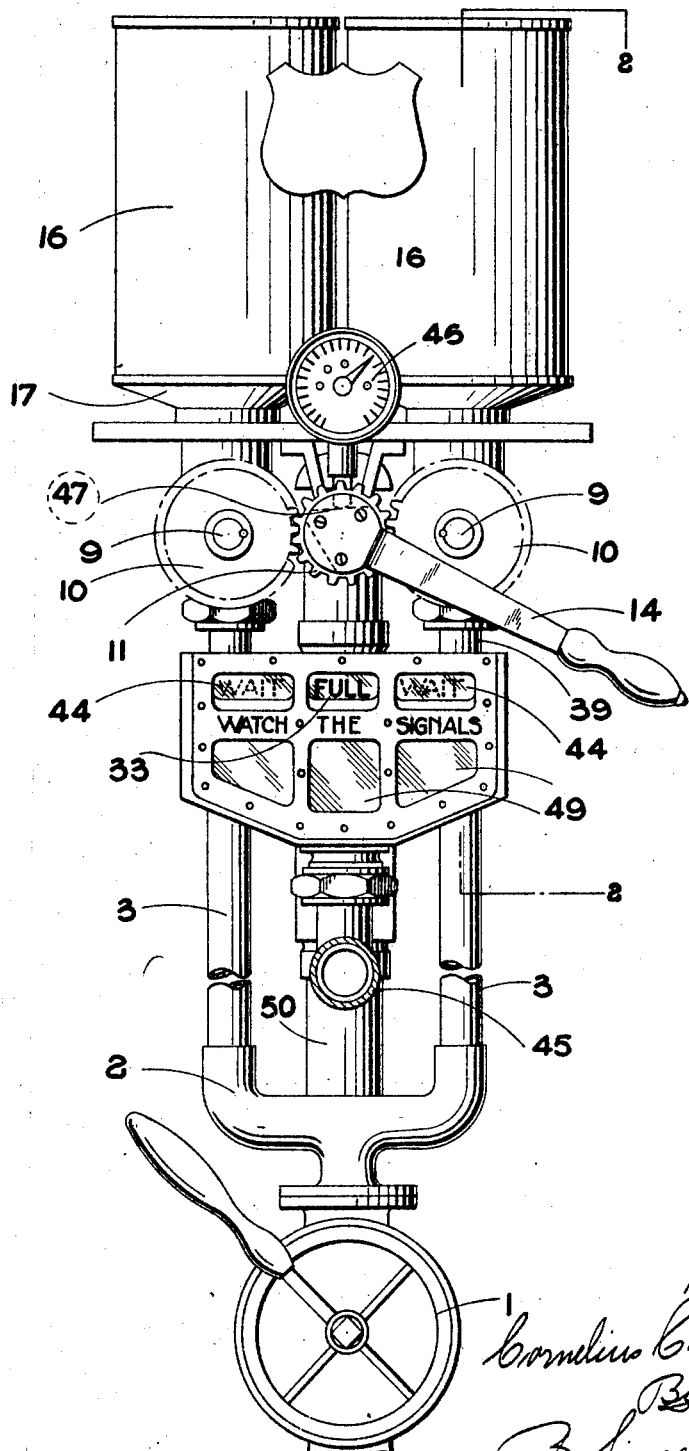
Figure 1 is a front view of one form of the apparatus.

In the construction illustrated the petrol or other liquid is pumped by a pump such as 1 into a junction piece 2 and up through the pipes 3, 3. The two pipes 3 each lead to a valve casing 4 in which is located a suitable valve 5. The valves illustrated are plug valves and each is provided with a port 6 leading into the valve from its periphery and out at the end of the valve, which port I will refer to as the "inlet" port, and each valve is provided with a second transverse port 7 which serves as a discharge port. It will be seen that the direction of the port 7 is at right angles to the direction of the leading in portion of the valve 6.

Each valve casing 4 is provided with a gland 8 by which the valve is made fluid tight, and each valve 5 is provided with a stem 9 upon which is mounted a spur wheel 10. The two spur wheels 10 are geared together by a spur pinion 11 mounted upon a spindle 12 supported in a suitable bracket 13. The spindle 12 is provided with a handle 14 so that the spur wheel 11 can be rotated when required to operate the two valves 5 simultaneously.

The arrangement is such that when one valve 5 is in the position shown in Figure 2 with its inlet port open and its discharge port closed, the other valve is in the opposite position, i. e. its discharge port 7 is open and its inlet valve 6 is closed. Thus the liquid forced up the pipes 3 by the pump 1 passes alternately first into a feed pipe 15 connected to one valve casing and then into a similar feed pipe 15 connected to the other valve casing.

The measuring chambers 16 may be of the cylindrical form shown having a domed or conical base 17 and a domed or part conical roof 18. The actual cylinder forming the main part of the chamber is continued upwardly as shown at 19 so that an annular gallery or chamber 20 is formed around the roof of each chamber.

The top or roof of each chamber 18 is provided with a suitable number of, three are shown, neck pieces 21 which may be screw threaded either internally or externally and adjustable sleeves 22 are screwed into these neck pieces so that after the apparatus has been erected at the roadside, these neck pieces may be adjusted with care to ensure that the capacity of the measure is absolutely accurate. When a correct adjustment has been arrived at, the neck pieces may be sealed.

The upper parts of the pipes 15 pass into the spaces above the roofs 18 of the measuring chambers and at the highest point 23 an opening 24 is preferably provided for the purpose of breaking any siphoning action which might otherwise be possible. The ends of the pipes 15 lead downwardly through a central hole in the roof 18 of each measuring chamber and a perforated hollow discharge member 25 may be provided to avoid turbulence in the liquid as it is fed into the measuring chamber.

As each measuring chamber 16 is completely filled, the liquid therefrom overflows through one or more of the sleeves 22, the opening through which constitute overflow passages. Such overflow passes into the annular space 20 from which there are discharge openings 26 leading to a common overflow pipe 27. The pipe 27 leads direct to a chamber 28 where the overflowing liquid falls into a cup 29 formed or mounted on a lever 30 pivoted at 31 and having its end provided with an indicating device or signal 32.

The front end of the chamber 28 is provided with a transparent panel 33 through which the indicator or signal 32 can be seen when the lever is tilted by the weight of liquid in the cup 29. Normally however, when the cup 29 is emptied the lever is overbalanced by the weight of the signal or indicating device 32 and occupies the position shewn in Figure 4 in which the signal or indicating device is not visible.

The cup 29 is provided with relatively small perforations 34 so that after a short period it empties itself automatically and returns to the position shown in Figure 4.

The indicating device or signal 32 may take any suitable form. In the illustrated construction a visual signal bearing the word "Full" is shown and it will be understood that as each measuring chamber 16 is completely filled and overflows, this signal "Full" will be exhibited for a period sufficiently long for a purchaser to observe it, the purchaser of course, taking care that the operator does not open the discharge valve of either chamber until after the signal "Full" has been given for that chamber.

The operation of the valves is rendered apparent to the purchaser by any suitable signal. In the apparatus illustrated a bell 35 is provided, the spindle 12 being provided with a collar 36 carrying a pair of arms 37 which when the valves are operated are moved so as to operate one of the spring pressed triggers 38. The arms 37 move past the triggers 38 and allow the triggers 38 to spring back and strike the bell.

The discharges from the chambers 16 are delivered by pipes 39 into what I may term an "interception" chamber 40. Directly under the end of each pipe 39 is a lever 41 of similar construction to the lever 30 and having a perforated cup 42 and an indicator or signal 43. Normally the indicators or signals 43 cannot be seen from the front of the apparatus but during the period of the discharge the levers 41 are rocked to bring the indicators or signals 43 into line with transparent panels 44. These indicators or signals may be marked with the word "Wait" indicating that the operator must wait until the said signal has disappeared before operating the valves again.

If required the discharges from a plurality of measuring chambers or portions of such discharges may be guided to the cup or vane of a single mechanical device for setting in action or controlling a signal instead of providing a separate mechanical device and signal for each discharge.

The interception chamber 40 receives the discharge from the two measuring chambers and allows of the continuous operation of the discharge. In operating the apparatus a certain period of time is of course, occupied in the operation of the valves and if no interception chamber such as 40 were provided, the discharge to the tank of the vehicle would be interrupted during this period. By providing an interception chamber the discharge through the flexible or other pipe 45 is continuous.

In order to have a record of the number of gallons of liquid delivered, a mechanical counter 46 may be provided operated by a cam 47 on the spindle 12, the cam 47 acting upon a push rod 48 provided on the mechanical counter.

As will be seen from Figures 1 and 6, the interception chamber 40 is provided with transparent panels 49 through which the passage of the liquid can be seen. The chamber 28 into which the overflow passes is located partially within the interception chamber 40 but is divided therefrom. The chamber 28 is provided with a return pipe 50 leading the overflow back to the source of supply.

A suitable stop is associated with the handle 14 or with the spindle 12 limiting its motion in both directions.

Instead of using the cups 29 and 42 plates or vanes which may be flat or even convex may be used, said plates or vanes being adapted to be displaced by the flow of the liquid.

What I claim then is:—

1. Apparatus for delivering measured quantities by volume of liquid, comprising a pump, a two armed junction pipe taking delivery from said pump, two valve casings each connected to one of said arms, valves in said casings, an elbow on the end of each valve casing, said valves having ports controlling passage of liquid to said elbows, measuring chambers disposed one above each valve chamber, shouldered discharge pipes on the bottoms of the said measuring chambers, a connecting and supporting plate engaged by both of said discharge pipes, upper and lower branches on the valve casing constituting discharge passages from the measuring chambers, said upper branches being connected to said discharge pipes below said plate, an interception chamber connected by pipes to both of said lower branches, said valves having ports controlling passage of liquid through said branches, a discharge pipe leading from said interception chamber, pipes connecting said elbows with the upper parts of the measuring chambers, brackets on said plate, a spindle rotatably mounted in said brackets, an operating handle on said spindle, and gearing associated with said operating handle and with said valves whereby said valves are operated simultaneously.

2. Apparatus for delivering measured quantities by volume of liquid, comprising a pump, a two armed junction pipe taking delivery from said pump, two valve casings each connected to one of said arms, valves in said casings, measuring chambers disposed one above each valve chamber, pipes connecting said valve casings with the upper parts of said measuring chambers, overflow collecting chambers formed above said measuring chambers, shouldered discharge pipes on the bottom of said measuring chambers, a connecting and supporting plate engaged by both of said discharge pipes, upper and lower branches on the valve casing constituting discharge passages from the measuring chambers, said upper branches being connected to said discharge pipes below said plate, an interception chamber connected by pipes to both of said lower branches, an overflow return chamber within said interception chamber, a pipe connecting the overflow collecting chambers with said overflow return chamber, a discharge pipe leading from said interception chamber, brackets on said plate, a spindle rotatably mounted in said brackets, an operating handle on said spindle, and gearing associated with said operating handle and with said valves whereby said valves are operated simultaneously.

3. Apparatus for delivering measured quantities by volume of liquid, comprising a pump, a two armed junction pipe taking delivery from said pump, two valve casings each connected to one of said arms, valves in said casings, measuring chambers disposed one above each valve chamber, pipes connecting said valve casings with the upper parts of said measuring chambers, overflow collecting chambers formed above said measuring chambers, shouldered discharge pipes on the bottoms of said measuring chambers, a connecting and supporting plate engaged by both of said discharge pipes, upper and lower branches on the valve casing constituting discharge passages from the measuring chambers, said upper branches being connected to said discharge pipes below said plate, an interception chamber connected by pipes to both of said lower branches, an overflow return chamber within said interception chamber, a pipe connecting the overflow collecting chambers with said overflow return chamber, mechanical signals in said interception and overflow return chamber, operated by flow of the liquid, a discharge pipe leading from said interception chamber, brackets on said plate a spindle rotatably mounted in said brackets, an operating handle on said spindle, and gearing associated with said operating handle and with said valves whereby said valves are operated simultaneously.

In witness whereof I affix my signature.

CORNELIUS CHAMBERS.